(12) United States Patent
Lee et al.

(10) Patent No.: US 12,423,832 B2
(45) Date of Patent: Sep. 23, 2025

(54) METHOD AND APPARATUS WITH OBJECT TRACKING

(71) Applicant: SAMSUNG ELECTRONICS CO., LTD., Suwon-si (KR)

(72) Inventors: Dongwook Lee, Suwon-si (KR); Seohyung Lee, Suwon-si (KR); Changbeom Park, Suwon-si (KR); Byung In Yoo, Suwon-si (KR); Hyunjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 17/987,231

(22) Filed: Nov. 15, 2022

(65) Prior Publication Data

US 2023/0351610 A1 Nov. 2, 2023

(30) Foreign Application Priority Data

Apr. 28, 2022 (KR) .................. 10-2022-0052608
Jun. 16, 2022 (KR) .................. 10-2022-0073261

(51) Int. Cl.
G06T 7/00 (2017.01)
G06T 7/20 (2017.01)
G06T 7/246 (2017.01)

(52) U.S. Cl.
CPC .................. *G06T 7/20* (2013.01); *G06T 7/97* (2017.01); *G06T 2207/10016* (2013.01)

(58) Field of Classification Search
CPC ... G06T 7/20; G06T 7/97; G06T 2207/10016; G06T 2207/20081; G06T 2207/20084; G06T 7/248
See application file for complete search history.

(56) References Cited

U.S. PATENT DOCUMENTS 6,724,915 B1 * 4/2004 Toklu .................. G06T 7/248
382/168
9,179,201 B2 11/2015 Chao et al.
(Continued)

FOREIGN PATENT DOCUMENTS

KR 10-1195978 B1 10/2012
KR 10-2019-0023389 A 3/2019
(Continued)

OTHER PUBLICATIONS

Gao, Yuefang, et al. "Unifying temporal context and multi-feature with update-pacing framework for visual tracking." IEEE Transactions on Circuits and Systems for Video Technology 30.4 (2019): 1078-1091. (Year: 2019).*

(Continued)

*Primary Examiner* — Stephen R Koziol
*Assistant Examiner* — Joshua Chen
(74) *Attorney, Agent, or Firm* — NSIP Law

(57) ABSTRACT

A processor-implemented method with object tracking includes: performing, using a first template, forward object tracking on first image frames in a first sequence group; determining a template candidate of a second template for second image frames in a second sequence group; performing backward object tracking on the first image frames using the template candidate; determining a confidence of the template candidate using a result of comparing a first tracking result determined by the forward object tracking performed on the first image frames and a second tracking result determined by the backward object tracking performed on the first image frames; determining the second template based on the confidence of the template candidate; and performing forward object tracking on the second image frames using the second template.

20 Claims, 11 Drawing Sheets

(56) References Cited

U.S. PATENT DOCUMENTS

| | | | |
|---|---|---|---|
| 9,311,534 B2* | 4/2016 | Liang | G06V 10/50 |
| 9,760,791 B2* | 9/2017 | Rastgar | G06T 7/20 |
| 10,089,330 B2* | 10/2018 | Gao | G06F 16/7837 |
| 10,346,465 B2* | 7/2019 | Xin | G06F 3/0488 |
| 10,628,961 B2* | 4/2020 | Sundaresan | G06T 7/20 |
| 10,902,615 B2* | 1/2021 | Tao | G06F 18/22 |
| 2022/0138493 A1 | 5/2022 | Lee et al. | |
| 2022/0301188 A1 | 9/2022 | Yoon et al. | |
| 2023/0206586 A1 | 6/2023 | Lee et al. | |
| 2023/0368542 A1* | 11/2023 | Ogawa | G06V 20/58 |

FOREIGN PATENT DOCUMENTS

| | | |
|---|---|---|
| KR | 10-2020-0052410 A | 5/2020 |
| KR | 10-2023-0099244 A | 7/2023 |

OTHER PUBLICATIONS

Wang, Xiaolong, et al. "Learning correspondence from the cycle-consistency of time." *Proceedings of the IEEE/CVF Conference on Computer Vision and Pattern Recognition*. (2019). pp. 2566-2576.

Yuan, Weihao, et al. "Self-supervised object tracking with cycle-consistent siamese networks." *2020 IEEE/RSJ International Conference on Intelligent Robots and Systems (IROS)*. IEEE, (2020). pp. 1-8.

Yan, Bin, et al. "Learning spatio-temporal transformer for visual tracking." *Proceedings of the IEEE/CVF International Conference on Computer Vision*. (2021). pp. 10448-10457.

Li, Bo, et al. "High performance visual tracking with siamese region proposal network." *Proceedings of the IEEE conference on computer vision and pattern recognition*. (2018). pp. 8971-8980.

Sun, Peize, et al. "Dancetrack: Multi-object tracking in uniform appearance and diverse motion." *Proceedings of the IEEE/CVF Conference on Computer Vision and Pattern Recognition*. (2022). pp. 20993-21002.

Liu, Ze, et al. "Swin transformer: Hierarchical vision transformer using shifted windows." *Proceedings of the IEEE/CVF International Conference on Computer Vision*. (2021). pp. 10012-10022.

Ye, Botao, et al. "Joint feature learning and relation modeling for tracking: A one-stream framework." *European Conference on Computer Vision*. Springer, Cham, (2022). pp. 1-23.

Čehovin, Luka, et al., "Is my new tracker really better than yours?" IEEE Winter Conference on Applications of Computer Vision. IEEE, 2014, (8 pages).

Cigla, Cevahir, et al., "Onboard Stereo Vision for Drone Pursuit or Sense and Avoid." Proceedings of the IEEE Conference on Computer Vision and Pattern Recognition Workshops. 2018, (9 pages).

Gao, Yuefang, et al. "Unifying Temporal Context and Multi-Feature with Update-Pacing Framework for Visual Tracking." IEEE Transactions on Circuits and Systems for Video Technology 30.4 (2020): 1078-1091.

Extended European search report issued on Oct. 12, 2023, in counterpart European Patent Application No. 23150758.3 (10 pages).

* cited by examiner

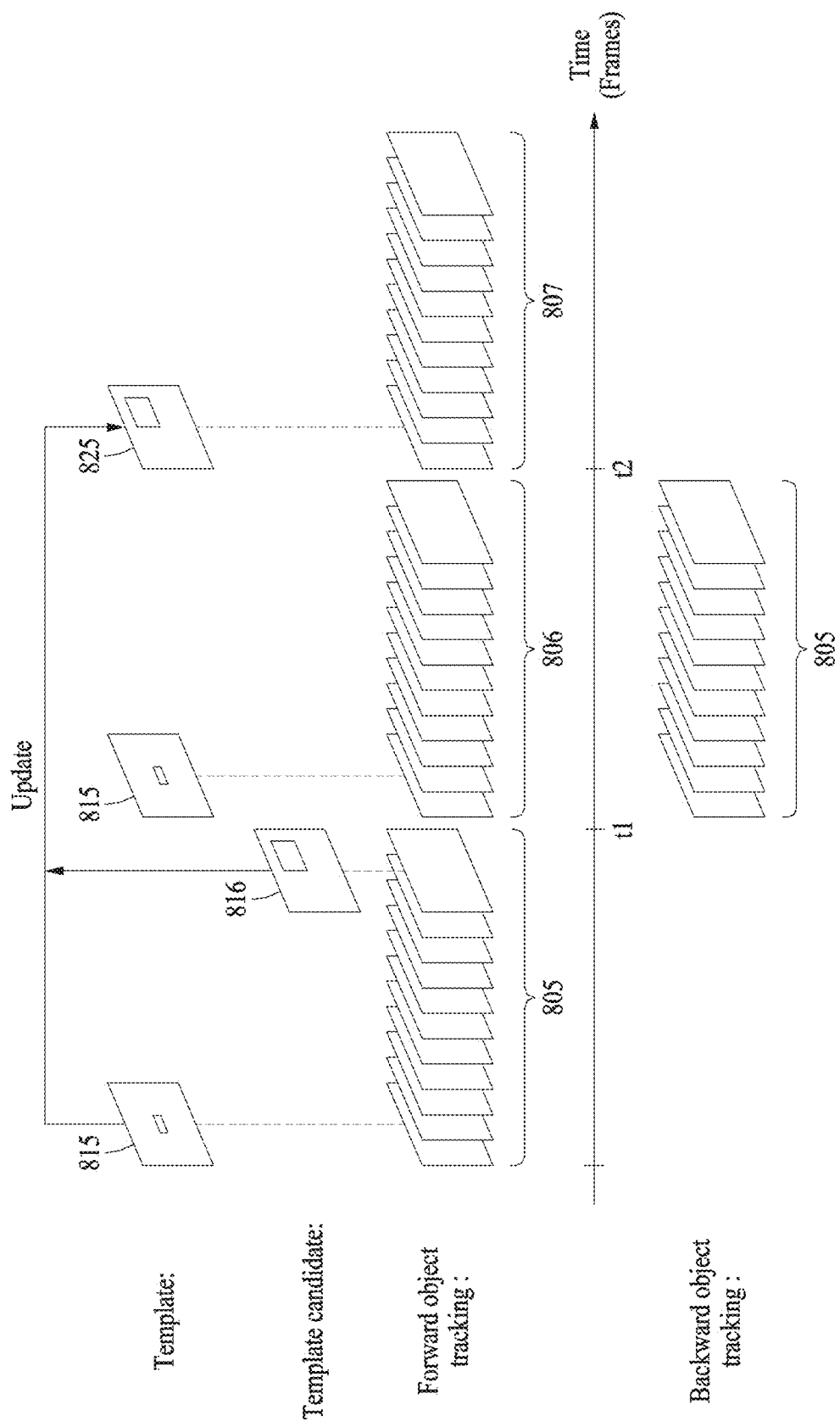

METHOD AND APPARATUS WITH OBJECT TRACKING

CROSS-REFERENCE TO RELATED APPLICATIONS

This application claims the benefit under 35 USC § 119(a) of Korean Patent Application No. 10-2022-0052608, filed on Apr. 28, 2022 at the Korean Intellectual Property Office, and claims the benefit under 35 USC § 119(a) of Korean Patent Application No. 10-2022-0073261, filed on Jun. 16, 2022 at the Korean Intellectual Property Office, the entire disclosures of which are incorporated herein by reference for all purposes.

BACKGROUND

1. Field

The following description relates to a method and apparatus with object tracking.

2. Description of Related Art

Technical automation of a recognition process may be implemented using, for example, a neural network model implemented by a processor as a special calculation structure, which may provide a computationally intuitive mapping between an input pattern and an output pattern after considerable training. The trained ability to generate such a mapping may be referred to as a learning ability of the neural network. Moreover, such a specialized and specially trained neural network, due to the specialized training, may have a generalization ability that allows the network to generate a relatively accurate output for an input pattern on which the network is not trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with object tracking includes: performing, using a first template, forward object tracking on first image frames in a first sequence group; determining a template candidate of a second template for second image frames in a second sequence group; performing backward object tracking on the first image frames using the template candidate; determining a confidence of the template candidate using a result of comparing a first tracking result determined by the forward object tracking performed on the first image frames and a second tracking result determined by the backward object tracking performed on the first image frames; determining the second template based on the confidence of the template candidate; and performing forward object tracking on the second image frames using the second template.

The forward object tracking may be performed on the first image frames in an order of an initial image frame of the first image frames to a last image frame of the first image frames, and the backward object tracking may be performed on the first image frames in an order of the last image frame of the first image frames to the initial image frame of the first image frames.

The forward object tracking and the backward object tracking may be performed on the first image frames using a same object tracking model.

The first tracking result may include first bounding boxes of the first image frames according to the forward object tracking performed on the first image frames, and the second tracking result may include second bounding boxes of the first image frames according to the backward object tracking performed on the first image frames.

The confidence of the template candidate may be determined based on any one or any combination of any two or more of a first score according to a degree of overlap between corresponding pairs of the first bounding boxes and the second bounding boxes for each corresponding image frame, a second score according to a degree of overlap between a corresponding pair of the first bounding boxes and the second bounding boxes for an initial image frame, and a third score according to a number of corresponding pairs of which a degree of overlap exceeds a preset level among the corresponding pairs of the first bounding boxes and the second bounding boxes for each image frame.

The confidence of the template candidate may be determined based on a degree of similarity between: a portion of the first tracking result corresponding to an image frame of the first image frames; and a portion of the second tracking result corresponding to the image frame.

The determining of the second template may include: determining that the template candidate is the second template in response to the confidence of the template candidate exceeding a preset threshold; and determining that the first template is the second template in response to the confidence of the template candidate being less than or equal to the preset threshold.

The object tracking method further may include: determining a second template candidate of the second template; performing backward object tracking on the first image frames using the second template candidate; and determining a confidence of the second template candidate using a result of comparing the first tracking result determined by the forward object tracking performed on the first image frames and a third tracking result determined by the backward object tracking performed on the first image frames using the second template candidate, and the determining of the second template may include determining the second template based on the confidence of the template candidate and the confidence of the second template candidate.

The determining of the second template candidate, the backward object tracking performed on the first image frames using the second template candidate, and the determining of the confidence of the second template candidate may be performed in parallel with the determining of the template candidate, the backward object tracking performed on the first image frames using the template candidate, and the determining of the confidence of the template candidate.

The object tracking method further may include performing forward object tracking on intermediate image frames in an intermediate sequence group between the first sequence group and the second sequence group for a time used to determine the second template.

The determining of the template candidate may include determining the template candidate based on the first tracking result.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with object tracking includes: a processor configured to: perform, using a first template, forward object tracking on first image frames in a first sequence group; determine a template candidate of a second template for second image frames in a second sequence group; perform backward object tracking on the first image frames using the template candidate; determine a confidence of the template candidate using a result of comparing a first tracking result determined by the forward object tracking performed on the first image frames and a second tracking result determined by the backward object tracking performed on the first image frames; determine the second template based on the confidence of the template candidate; and perform forward object tracking on the second image frames using the second template.

The forward object tracking may be performed on the first image frames in an order of an initial image frame of the first image frames to a last image frame of the first image frames, and the backward object tracking may be performed on the first image frames in an order of the last image frame of the first image frames to the initial image frame of the first image frames.

The first tracking result may include first bounding boxes of the first image frames according to the forward object tracking performed on the first image frames, and the second tracking result may include second bounding boxes of the first image frames according to the backward object tracking performed on the first image frames.

The confidence of the template candidate may be determined based on any one or any combination of any two or more of a first score according to a degree of overlap between corresponding pairs of the first bounding boxes and the second bounding boxes for each corresponding image frame, a second score according to a degree of overlap between a corresponding pair of the first bounding boxes and the second bounding boxes for an initial image frame, and a third score according to a number of corresponding pairs of which a degree of overlap exceeds a preset level among the corresponding pairs of the first bounding boxes and the second bounding boxes for each image frame.

The processor may be configured to: determine a second template candidate of the second template; perform backward object tracking on the first image frames using the second template candidate; determine a confidence of the second template candidate using a result of comparing the first tracking result determined by the forward object tracking performed on the first image frames and a third tracking result determined by the backward object tracking performed on the first image frames using the second template candidate; and, for the determining of the second template, determine the second template based on the confidence of the template candidate and the confidence of the second template candidate.

The determining of the second template candidate, the backward object tracking performed on the first image frames using the second template candidate, and the determining of the confidence of the second template candidate may be performed in parallel with the determining of the template candidate, the backward object tracking performed on the first image frames using the template candidate, and the determining of the confidence of the template candidate.

The processor may be configured to perform forward object tracking on intermediate image frames in an intermediate sequence group between the first sequence group and the second sequence group for a time used to determine the second template.

In another general aspect, an electronic device includes: a camera configured to generate an input image comprising a plurality of image frames; and a processor configured to: perform, using a first template, forward object tracking on first image frames in a first sequence group of the input image; determine a template candidate of a second template for second image frames in a second sequence group of the input image; perform backward object tracking on the first image frames using the template candidate; determine a confidence of the template candidate using a result of comparing a first tracking result determined by the forward object tracking performed on the first image frames and a second tracking result determined by the backward object tracking performed on the first image frames; determine the second template based on the confidence of the template candidate; and perform forward object tracking on the second image frames using the second template.

Other features and aspects will be apparent from the following detailed description, the drawings, and the claims.

BRIEF DESCRIPTION OF THE DRAWINGS

FIGS. 8A and 8B illustrate implementation examples of an operation of updating a template.

Figure 1:
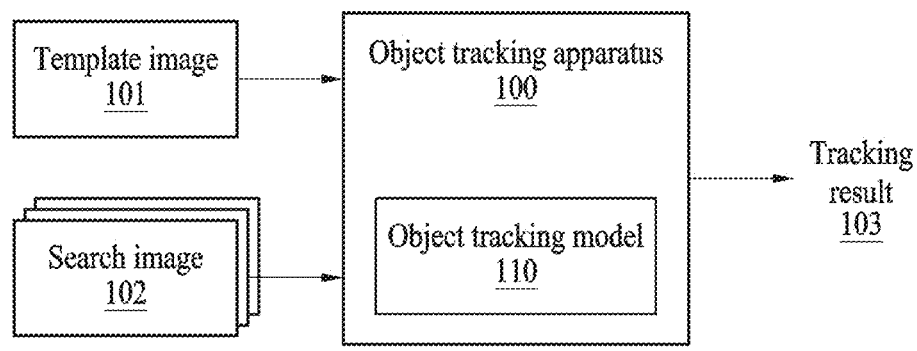
FIG. 1 illustrates an example of a configuration and an operation of an apparatus with object tracking.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

Although terms such as "first," "second," and "third" may be used herein to describe various members, components, regions, layers, or sections, these members, components, regions, layers, or sections are not to be limited by these terms (e.g., "first," "second," and "third"). Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same way.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, components, and/or combinations thereof, but do not preclude the presence or addition of one or more other features, integers, steps, operations, elements, components and/or combinations thereof. As used herein, the term "and/or" includes any one and any combination of any two or more of the associated listed items. The use of the term "may" herein with respect to an example or embodiment (for example, as to what an example or embodiment may include or implement) means that one or more examples or embodiments exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like elements and any repeated description related thereto will be omitted.

FIG. 1 illustrates an example of a configuration and an operation of an apparatus with object tracking (e.g., an object tracking apparatus). Referring to FIG. 1, an object tracking apparatus 100 may output a tracking result 103 based on a template image 101 and a search image 102. The template image 101 may provide information on a target object to be tracked. The object tracking apparatus 100 may track the target object in the search image 102 using target object information in the template image 101. The tracking result 103 may indicate a position of the target object in the search image 102. For example, the tracking result 103 may be used for an automatic tracking operation, a zooming operation, and/or a focusing operation.

According to an example, the template image 101 and the search image 102 may correspond to a plurality of image frames of an input image. For example, the template image 101 may correspond to one of a plurality of image frames included in an input video file, and the search image 102 may correspond to one or more of the image frames after (e.g., temporally subsequent to) the image frame corresponding to the template image 101. According to another example, the template image 101 and the search image 102 may correspond to files independent of each other. For example, the search image 102 may correspond to an input video file including a plurality of image frames, and the template image 101 may correspond to a still input image file irrelevant to the input video file. In any case, the template image 101 may include the target object, and the object tracking apparatus 100 may generate the tracking result 103 by tracking the target object in the search image 102. The template image 101 and the search image 102 may correspond to an entire or a partial region of a corresponding image frame. For example, the object tracking apparatus 100 may set a search region in the search image 102 to track the target object in the search region.

The object tracking apparatus 100 may generate the tracking result 103 using an object tracking model 110. The object tracking model 110 may be or include an artificial intelligence model trained or learned based on machine learning. For example, the object tracking model 110 may be or include a deep neural network (DNN) including a plurality of layers. The plurality of layers may include an input layer, one or more hidden layers, and an output layer.

The DNN may include any one or any combination of any two or more of a fully connected network (FCN), a convolutional neural network (CNN), and a recurrent neural network (RNN). For example, at least a portion of the layers included in the neural network may correspond to a CNN, and another portion of the layers may correspond to an FCN. In this case, the CNN may be referred to as convolutional layers, and the FCN may be referred to as fully connected layers.

In the case of the CNN, data input to each layer may be referred to as an input feature map, and data output from each layer may be referred to as an output feature map. The input feature map and the output feature map may also be referred to as activation data. For example, when the convolution layer corresponds to an input layer, an input feature map of the input layer may be an input image. In this example, an output feature map may be generated through a convolution operation between the input feature map and a weight kernel. The input feature map, the output feature map, and the weight kernel may be distinguished by a unit of a tensor.

After the neural network is trained based on deep learning, the neural network may perform an inference that is suitable for a purpose for the training by mapping input data and output data that are in a nonlinear relationship to each other. Deep learning is a machine learning technique for solving a problem such as recognizing image or speech data in a big data set. Deep learning may be construed as an optimization problem solving process of finding a point at which energy is minimized while training a neural network using prepared training data.

Through supervised or unsupervised deep learning, a structure of the neural network or a weight corresponding to a model may be obtained (e.g., generated or determined), and the input data and the output data may be mapped to each other through the weight. When the width and the depth of the neural network are sufficiently great, the neural network may have a capacity sufficient to implement a predetermined function. The neural network may achieve an optimized performance by learning a sufficiently large amount of training data through an appropriate training process.

In the following, the neural network may be represented as being trained "in advance". Here, being trained "in advance" means being trained before the neural network "starts". That the neural network "starts" means that the neural network is ready for inference. For example, that the neural network that "starts" may include that the neural network is loaded into a memory, or that input data for inference is input into the neural network after the neural network is loaded into the memory.

The object tracking apparatus 100 may input the template image 101 and the search image 102 to the object tracking model 110 and obtain the tracking result 103 from an output of the object tracking model 110. The object tracking model 110 may be pre-trained to output the tracking result 103 based on the template image 101 and the search image 102 being input.

Figure 2:
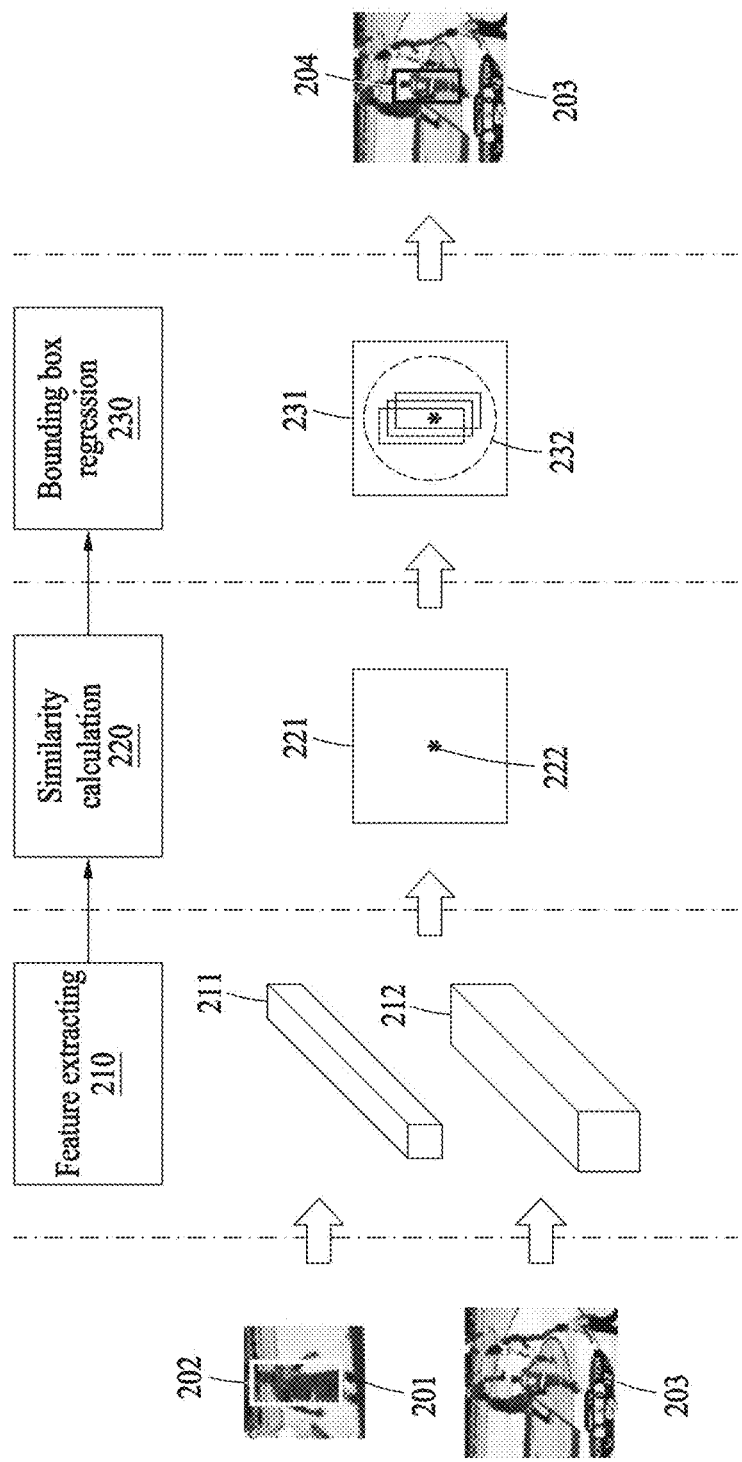
FIG. 2 illustrates an example of an operation of deriving a similarity score.

FIG. 2 illustrates an example of an operation of deriving a similarity score. Referring to FIG. 2, an object tracking apparatus (the object tracking apparatus 100 of FIG. 1, as a non-limiting example) may perform object tracking based on feature extracting 210, similarity calculation (e.g., determination) 220, and bounding box regression 230. Any one or any combination of any two or more of the feature extracting 210, the similarity calculation 220, and the bounding box regression 230 may be performed through an object tracking model (the object tracking model 110 of FIG. 1, as a non-limiting example). For example, the object tracking model may include any one or any combination of any two or more of a feature extracting network for the feature extracting 210, a similarity calculation network for the similarity calculation 220, and a bounding box regression network for the bounding box regression 230. The feature extracting network, the similarity calculation network, and the bounding box regression network may each correspond to a neural network. As an example, the object tracking model may include a Siamese network.

The object tracking apparatus may extract a template feature map 211 from a template image 201 and extract a search feature map 212 from a search region 203. The object tracking apparatus may extract the template feature map 211 and the search feature map 212 using the object tracking model and/or a feature extracting model that share a parameter. As shown by the illustration of the example of FIG. 2, the template image 201 may correspond to a partial region of an initial image frame of an input image and the search region 203 may correspond to a partial region of an n-th image frame of the input image. "n" may be greater than "1". An operation of preparing the template feature map 211 of the template image 201 through the object tracking model may be an operation of initializing the object tracking model.

In response to a target object being determined in a first image frame, a target box 202 corresponding to the target object may be designated (e.g., generated or determined). For example, the target object may be determined according to a user input of selecting the target object. The target box 202 may be a type of a bounding box, and may be specified through box position information (e.g., an x-coordinate and a y-coordinate) and box size information (e.g., a width and a height). The box position information and the box size information may be collectively referred to as box information. The template image 201 may be determined based on a position and a size of the target box 202. The search region 203 may be determined based on the template image 201. A size of the search region 203 may be determined based on a size of the template image 201. For example, the size of the search region 203 may be determined to be larger than the size of the template image 201. A position of the search region 203 in the n-th image frame may be determined based on the position of a target box of a previous image frame. For example, in response to a target box being detected from an (n−1)-th image frame, the search region 203 of the n-th image frame may be determined based on a position of the target box.

The object tracking apparatus may calculate (e.g., determine) a similarity by comparing the template feature map 211 and the search feature map 212. The similarity calculation 220 may be performed through the similarity calculation network. The similarity calculation network may derive a cross-correlation between the template feature map 211 and the search feature map 212 through a cross-correlation layer. A calculation result may indicate a position in the search region 203 corresponding to information on the target object and/or the template feature map 211. For example, the calculation result may display a corresponding position 222 and/or a score of the corresponding position 222 on a search space 221 corresponding to the search region 203.

The object tracking apparatus may perform a regression analysis using bounding boxes 232 of the corresponding position 222 in a search space 231 corresponding to the search region 203. In a non-limiting example, the search space 231 may be the search space 221. The object tracking apparatus may determine a target box 204 corresponding to the target object in the search region 203 through the regression analysis and generate a tracking result based on box information of the target box 204.

Figure 3:
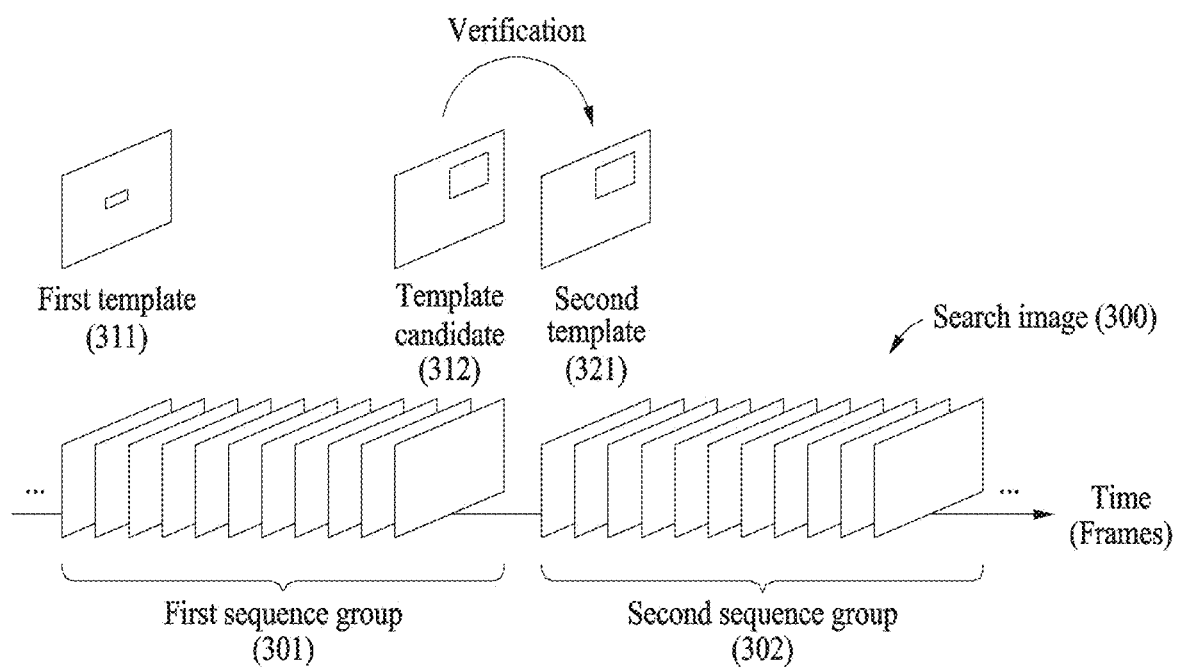
FIG. 3 illustrates an example of an operation of updating a template.

FIG. 3 illustrates an example of an operation of updating a template. Referring to FIG. 3, a plurality of image frames of a search image 300 may be divided into a plurality of sequence groups including a first sequence group 301 and a second sequence group 302. Each of the sequence groups may include a plurality of image frames. A change in an appearance of a target object in the search image may cause a difference between an appearance of a target object in a template image and the appearance of the target object in the search image such that performance of object tracking of a typical object tracking apparatus may be reduced. However, when the difference between the appearance of the target object in the template image and the appearance of the target object in the search image occurs, the objection tracking apparatus of one or more embodiments may prevent a decrease in the performance of object tracking by applying the change in the appearance of the target object appearing in the search image to a template through a template update.

For example, a difference between an appearance of a target object appearing in first image frames in the first sequence group 301 and an appearance of a target object appearing in second image frames of the second sequence group 302 may occur, and a first template 311 for object tracking in the first sequence group 301 may be updated to a second template 321 for object tracking in the second sequence group 302. For example, the first template 311 may be determined from an initial image frame of the first sequence group 301, and the second template 321 may be determined from a last image frame of the first sequence group 301.

The typical object tracking apparatus may significantly reduce the performance of object tracking by updating a template with an inappropriate image. For example, as a result of a template update, a new template image replacing an existing template image may indicate an incorrect object other than a target object, or the new template image may have an issue such as blurring and/or occlusion. However, the objection tracking apparatus of one or more embodiments may prevent deterioration in the performance of object tracking, due to an inappropriate template image, by verifying a new template through suitability evaluation and performing a template update according to the new template that passes the verification. For example, a template candidate 312 for the second template 321 may be selected, and the second template may be determined through a verification procedure to verify the template candidate 312.

The performance of object tracking may depend on how suitability of a template is evaluated. The typical object tracking apparatus may not properly reflect a change in an appearance appearing in the new template and/or the existing template, and thus performance may be poor, by simply evaluating suitability of a new template based on a similarity between the new template and an existing template. For example, when a target object in a new template is captured with changes in illuminance, appearance, color, and the like, compared to an existing template, a confidence of the new template may be measured as low due to a difference between the new template and the existing template, even when the new template indicates a correct target object.

However, the object tracking apparatus of one or more embodiments may evaluate suitability of the template candidate 312 based on backward object tracking. Backward object tracking may indicate not only an appearance of an object in the template candidate 312 but also a history of the object in previous frames. The object tracking apparatus of one or more embodiments may improve tracking performance by basing object tracking on backward object tracking.

Figure 4:
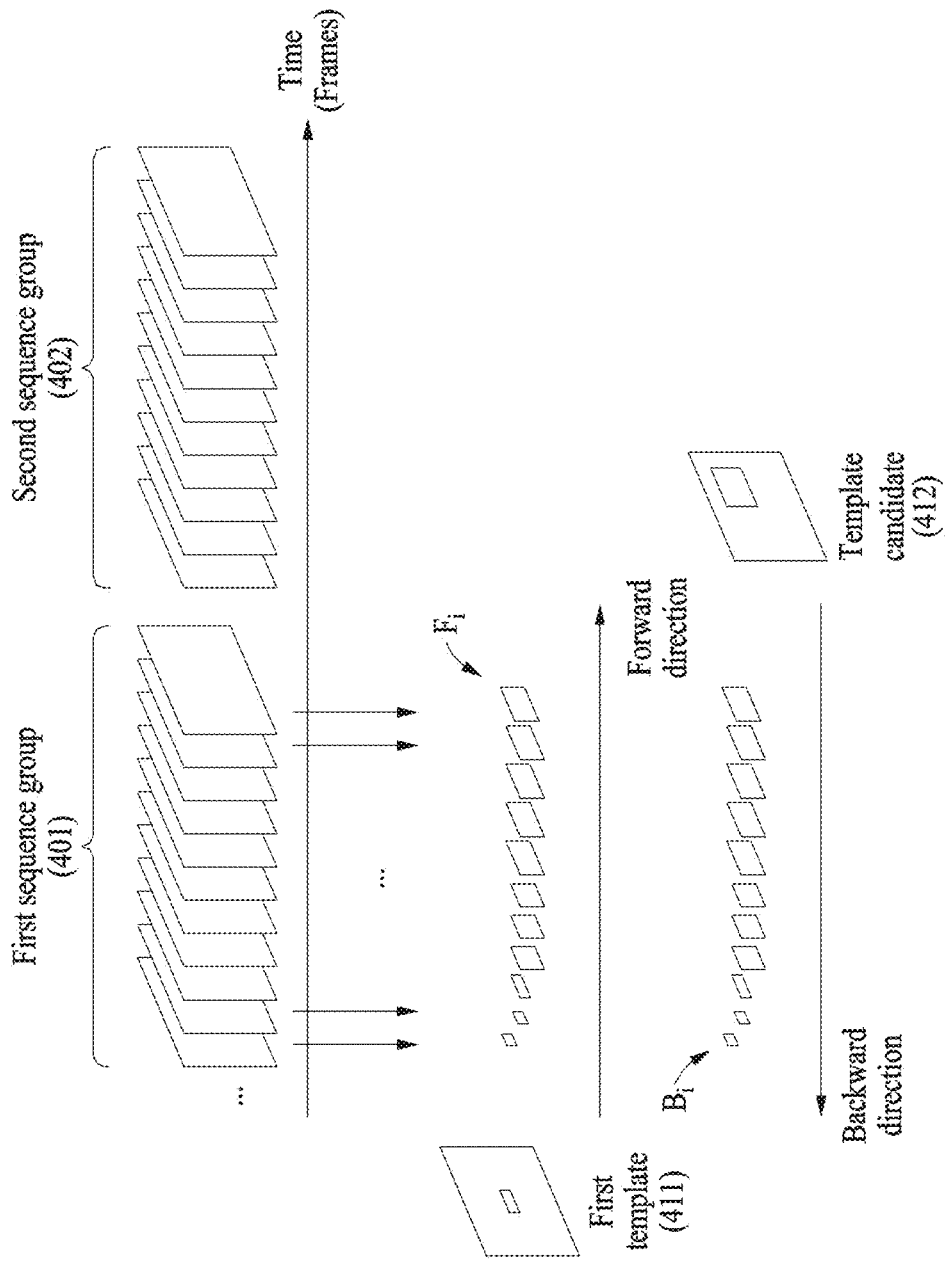
FIG. 4 illustrates an example of tracking results obtained by forward object tracking and backward object tracking.

FIG. 4 illustrates an example of tracking results obtained by forward object tracking and backward object tracking. Referring to FIG. 4, an object tracking apparatus (the object tracking apparatus 100 of FIG. 1, as a non-limiting example) may perform forward object tracking on first image frames using a first template 411 for the first image frames in a first sequence group 401. A first tracking result $F_i$ may be determined according to the forward object tracking performed on the first image frames. The first tracking result $F_i$ may include first bounding boxes of the first image frames generated according to the forward object tracking performed on the first image frames. "i" denotes a frame number. The object tracking apparatus may track a target object corresponding to a first template 411 in the first image frames using an object tracking model.

The object tracking apparatus may determine a template candidate 412 of a second template for second image frames in a second sequence group 402. The object tracking apparatus may determine the template candidate 412 based on the first tracking result $F_i$. For example, the object tracking apparatus may determine the template candidate 412 from a bounding box of a last image frame among the first bounding boxes of the first tracking result $F_i$. The object tracking apparatus may perform backward object tracking on the first image frames in the first sequence group 401 using the template candidate 412. A second tracking result $B_i$ may be generated according to the backward object tracking performed on the first image frames. The object tracking apparatus may track a target object corresponding to the template candidate 412 in the first image frames using the object tracking model.

An order in which backward object tracking may process image frames may be opposite to an order in which forward object tracking may process image frames. For example, the forward object tracking may be performed on the first sequence group 401 in an order of an initial image frame of the first image frames to a last image frame of the first image frames, and the backward object tracking may be performed on the first sequence group 401 in an order of the last image frame of the first image frames to the initial image frame of the first image frames.

Forward object tracking and backward object tracking may be performed using a same object tracking model. For example, the object tracking apparatus may initialize an object tracking model with the first template 411 and generate the first tracking result $F_i$ by inputting the first image frames to the object tracking model in an order of the initial image frame to the last image frame. The initialization of the object tracking model may include extraction of a template feature map from a template image through the object tracking model. The object tracking apparatus may initialize the object tracking model with the template candidate 412 and generate the second tracking result $B_i$ by inputting the first image frames to the object tracking model in an order of the last image frame to the initial image frame. As such, while forward object tracking and backward object tracking are being performed, a parameter of the object tracking model may remain the same.

The object tracking apparatus may determine a confidence of the template candidate 412 using a result of comparing the first tracking result $F_i$ and the second tracking result $B_i$, and may determine a second template based on the confidence of the template candidate 412. For example, the object tracking apparatus may determine the confidence of the template candidate 412 based on a degree of overlap between at least some of corresponding pairs obtained from the first tracking result $F_i$ and the second tracking result $B_i$. A corresponding pair may include bounding boxes having a same frame number, including a bounding box from the first tracking result $F_i$ and another a bounding box from the second tracking result $B_i$. As examples, $F_1$ and $B_1$ may form a corresponding pair and $F_2$ and $B_2$ may form a corresponding pair. In a non-limiting example, a degree of overlap may be respectively determined for each corresponding pair, and the confidence of the template candidate 412 may be determined based on the degrees of overlap. The object tracking apparatus may determine that the template candidate 412 is the second template in response to the confidence of the template candidate 412 exceeding a preset threshold and may determine that the first template 411 is the second template in response to the confidence of the template candidate 412 being less than the preset threshold. When the first template 411 is determined as the second template, the first template 411 may be continuously used to track an object in the second sequence group 402.

Figure 5:
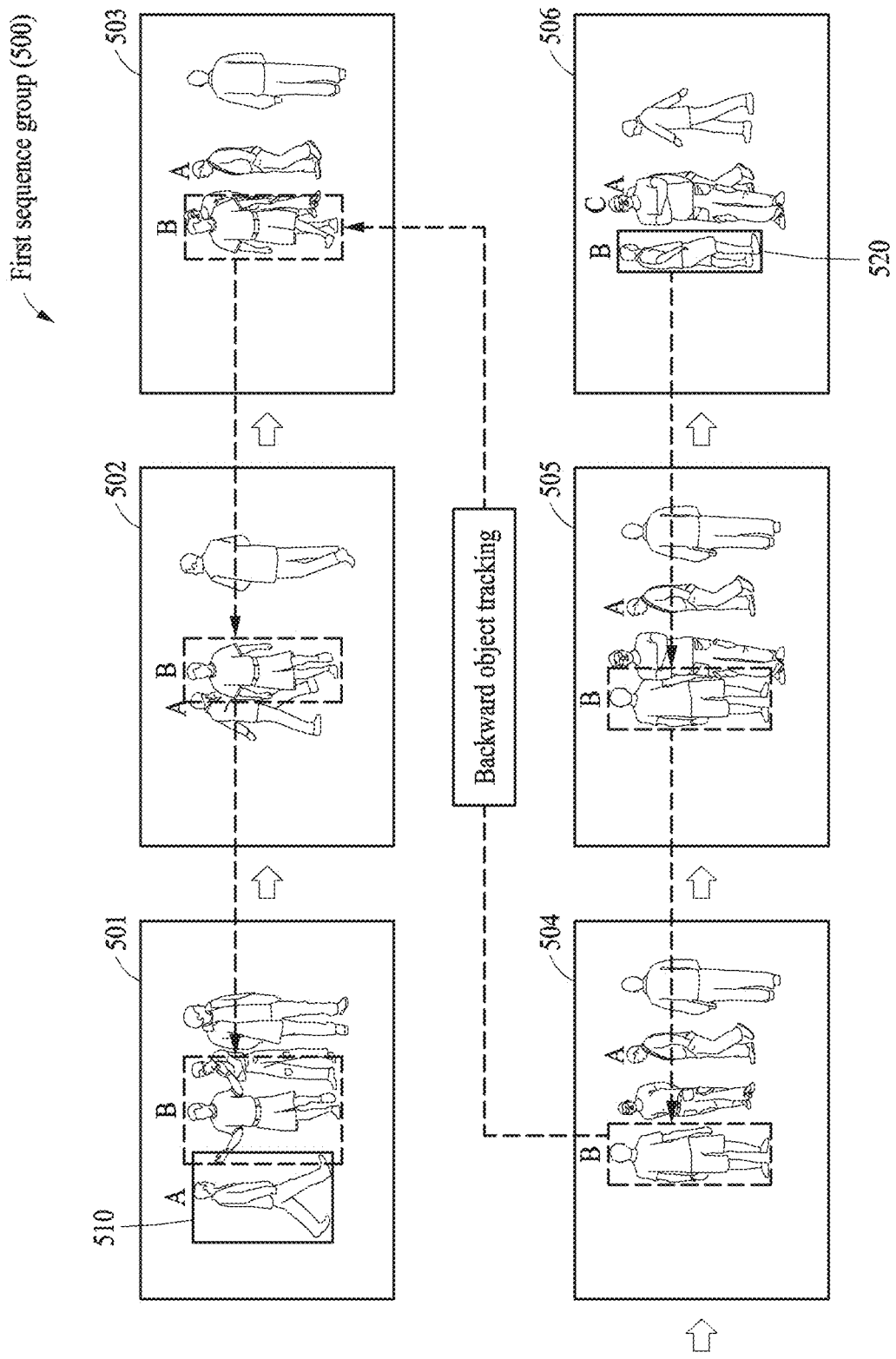
FIG. 5 illustrates an example of a verification capability of backward object tracking.

FIG. 5 illustrates an example of a verification capability of backward object tracking. Referring to FIG. 5, a first sequence group 500 may include image frames 501, 502, 503, 504, 505, and 506. A first template 510 may be set from an initial image frame 501, and an object tracking apparatus (the object tracking apparatus 100 of FIG. 1, as a non-limiting example) may track an object corresponding to the first template 510 in the image frames 501 to 506 by performing forward object tracking. A template candidate 520 may be determined from a last image frame 506. For example, an image of a bounding box corresponding to a tracking result of the last image frame 506 using the first template 510 may be determined as the template candidate 520.

As illustrated in FIG. 5, "A" indicates a target object, and "B" and "C" indicate a distractor. The distractor may be an object that is not the target object but may be mistaken for the target object. The template candidate 520 of the last image frame 506 may correspond to a distractor B not a target object A. The target object A may be obscured by a distractor C such that a bounding box may be formed to surround the distractor B, the distractor B being similar to the target object A. A typical object tracking apparatus may degrade object tracking performance by performing a template update with the template candidate 520.

The object tracking apparatus of one or more embodiments may track an object corresponding to the template candidate 520 in the image frames 501 to 506 by performing backward object tracking. The backward object tracking may consider not only an appearance of an object (the distractor B) in the template candidate 520 but also a history of the object in the previous image frames 501 to 505 such that accuracy of suitability evaluation of the template candidate 520 may be improved over the typical object tracking apparatus. Referring to FIG. 5, a tracking result obtained by the backward object tracking may indicate the distractor B not the target object A. For example, based on the tracking result obtained by the backward object tracking, the object tracking apparatus may determine that the template candidate 520 includes the distractor B and not the target object A. Accordingly, as a result of the backward object tracking, the template candidate 520 may be discarded, and the first template 510 may be continuously used to track an object in a next sequence group.

Figure 6:
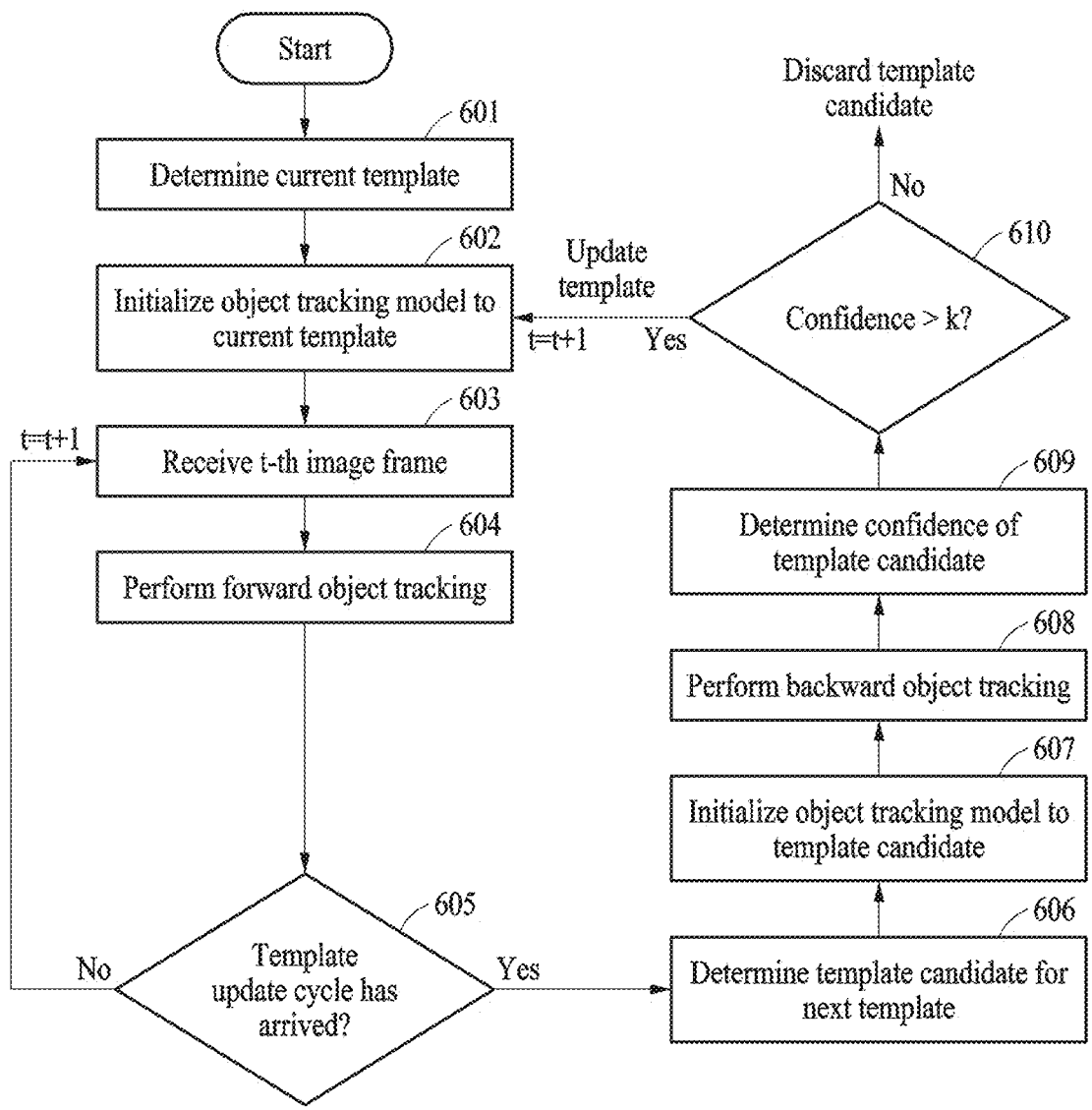
FIG. 6 illustrates an example of progress of forward object tracking and backward object tracking.

FIG. 6 illustrates an example of progress of forward object tracking and backward object tracking. Referring to FIG. 6, an object tracking apparatus (the object tracking apparatus 100 of FIG. 1, as a non-limiting example) may determine a current template in operation 601 and initialize an object tracking model with the current template in operation 602. For example, it may be determined that the current template corresponds to a bounding box of a target object of an initial image template.

The object tracking apparatus may receive a t-th search frame in operation 603 and perform forward object tracking in operation 604. A tracking result of the t-th search frame may be determined according to the forward object tracking. The tracking result may indicate a bounding box corresponding to the target object. In operation 605, the object tracking apparatus may check whether a template update cycle has arrived. For example, the template update cycle may be set in advance to update a template for every predetermined number of frames. When the update cycle has not arrived (e.g., when "t" is less than the predetermined number of frames), the object tracking apparatus may increase "t" and then perform operations 603 and 604 again.

When the template update cycle has arrived (e.g., when "t" is greater than or equal to the predetermined number of frames), the object tracking apparatus may determine a template candidate of a next template in operation 606 and initialize an object tracking model with the template candidate in operation 607. The object tracking model in operation 602 and the object tracking model in operation 607 may be initialized with different templates and use different template feature maps, but the models may share a network parameter. In other words, the object tracking model in operation 602 and the object tracking model in operation 607 may be a same model using different template feature maps. The object tracking apparatus may perform backward object tracking in operation 608. The backward object tracking may be performed in a backward direction on the image frames on which the forward object tracking is performed.

The object tracking apparatus may determine a confidence of a template candidate (e.g., the template candidate determined in operation 606) in operation 609. The object tracking apparatus may determine a first tracking result obtained by the forward object tracking (e.g., of operation 604) and a second tracking result obtained by the backward object tracking (e.g., of operation 608). The object tracking apparatus may determine the confidence of the template candidate based on a degree of overlap between at least some of corresponding pairs obtained from the first tracking result and the second tracking result. A corresponding pair may include bounding boxes having a same frame number, one from the first tracking result and the other from the second tracking result.

A bounding box from the first tracking result may be a first bounding box, and a bounding box from the second tracking result may be a second bounding box. The object tracking apparatus may determine the confidence of the template candidate based on any one or any combination of any two or more of a first score according to a degree of overlap between corresponding pairs of first bounding boxes and second bounding boxes for each corresponding image frame, a second score according to a degree of overlap between a corresponding pair of the first bounding boxes and the second bounding boxes in the initial image frame, and a third score according to a number of corresponding pairs of which a degree of overlap exceeds a preset level among the corresponding pairs of the first bounding boxes and the second bounding boxes for each corresponding image frame. For example, the object tracking apparatus may determine confidence based on an average or a weighted average of at least some of the scores.

The first score may be expressed by Equation 1 below, for example.

$$score1 = \frac{1}{N} \sum_{\{i=1 \ldots N\}} IoU(B_i, F_i) \qquad \text{Equation 1}$$

In Equation 1, score1 denotes the first score, N denotes a number of image frames (e.g., a number of image frames included in a sequence group), $B_i$ denotes a tracking result obtained by backward object tracking, $F_i$ denotes a tracking result obtained by forward object tracking, and $IoU(B_i, F_i)$ denotes a degree of overlap between $B_i$ and $F_i$.

The second score may be expressed by Equation 2 below, for example.

$$score2 = IoU(B_0, F_0) \qquad \text{Equation 2}$$

In Equation 2, score2 denotes the second score, $B_0$ denotes a tracking result obtained by backward object tracking performed on an initial image frame, and $F_0$ denotes a tracking result obtained by forward object tracking performed on the initial image frame.

The third score may be expressed by Equation 3 below, for example.

$$score3 = \frac{1}{N}\text{Count}(IoU_{\{i=1\ldots N\}}(B_i, F_i) > \tau) \quad \text{Equation 3}$$

In Equation 3, score3 denotes the third score, and T denotes a threshold for a degree of overlap.

The object detection apparatus may compare the confidence and a threshold k in operation 610. In response to the confidence being greater than the threshold k, the object detection apparatus may determine that a template candidate (e.g., the template candidate determined in operation 606) is reliable and may perform a template update with the template candidate. In response to the confidence being less than or equal to the threshold k, the object detection apparatus may determine that the template candidate is not reliable, may discard the template candidate, and may continuously use an existing template (e.g., the template determined in operation 601) in a next sequence group.

Figure 7:
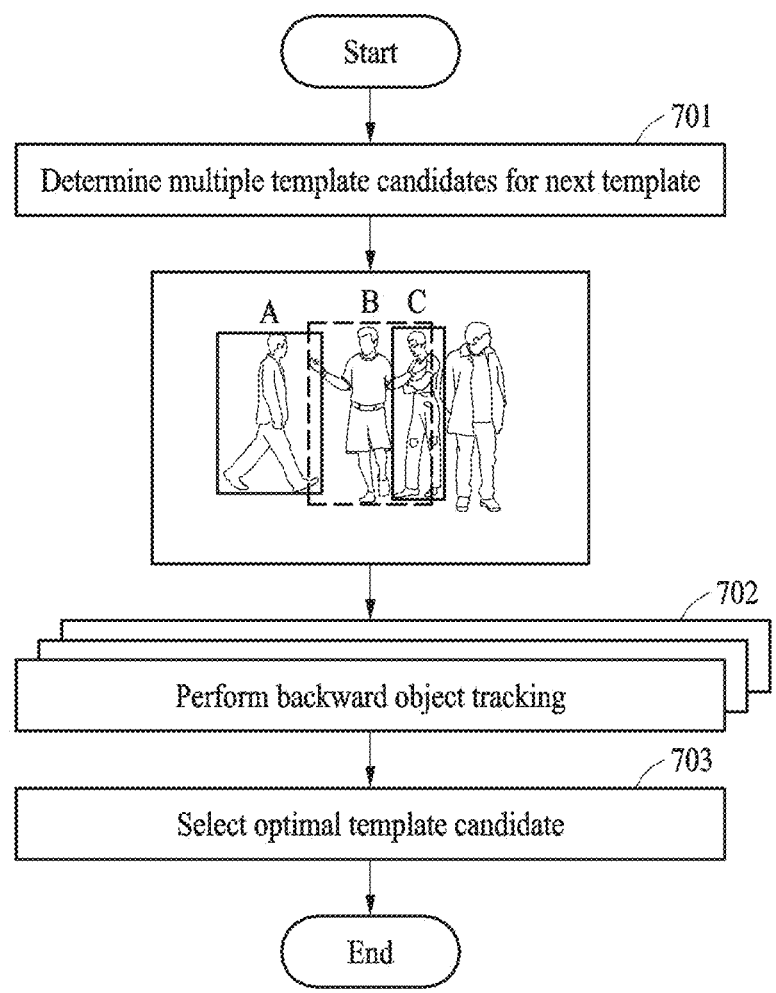
FIG. 7 illustrates an example of an operation of updating a template based on multiple template candidates.

FIG. 7 illustrates an example of an operation of updating a template based on multiple template candidates. Referring to FIG. 7, an object tracking apparatus (the object tracking apparatus 100 of FIG. 1, as a non-limiting example) may determine multiple template candidates in operation 701. A plurality of objects having a high degree of similarity to a current template may be determined as multiple template candidates. For example, a predetermined number of objects that has a high degree of similarity to the current template in an image frame may be selected as the multiple template candidates in sequential order. FIG. 7 illustrates an example in which an object A, an object B, and an object C are multiple template candidates. A bounding box surrounding each of the objects selected as multiple template candidates may correspond to a template candidate.

The object tracking apparatus may perform backward object tracking in operation 702. The object tracking apparatus may initialize an object tracking model with a template candidate of each of the multiple template candidates and perform backward object tracking on image frames using the object tracking model. As a result, a tracking result of the backward object tracking corresponding to each template candidate may be derived. The backward object tracking for each template candidate may be performed in parallel. In this case, a plurality of object tracking models sharing a parameter may be initialized with each template candidate.

The object tracking apparatus may select an optimal template candidate from among the multiple template candidates in operation 703. The object tracking apparatus may determine a confidence corresponding to a tracking result of each template candidate of the multiple template candidates and select a template candidate having a highest confidence from among template candidates of the multiple template candidates. The object tracking apparatus may perform a template update with the selected optimal template candidate. Since histories of objects similar to a target object may be comprehensively considered through multiple template candidates, possibility of a template update being appropriate may be greater.

Figure 8A:
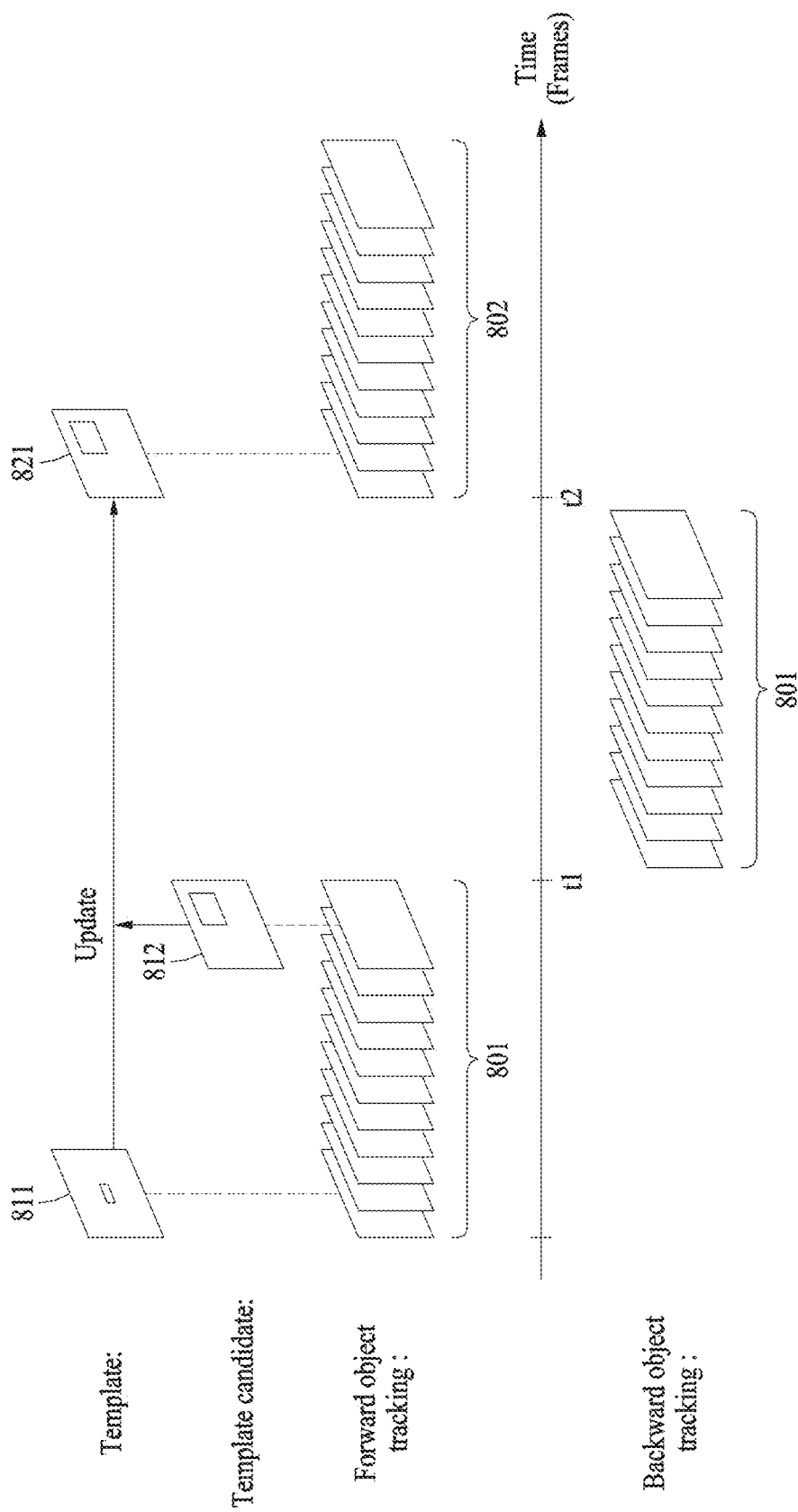

FIGS. 8A and 8B illustrate implementation examples of an operation of updating a template. Referring to FIG. 8A, an object tracking apparatus (the object tracking apparatus 100 of FIG. 1, as a non-limiting example) may perform forward object tracking on first image frames in a first sequence group 801 using a first template 811. The object tracking apparatus may determine a template candidate 812 based on a tracking result of the forward object tracking. The object tracking apparatus may perform backward object tracking on the first image frames in the first sequence group 801 using the template candidate 812.

The object tracking apparatus may evaluate a confidence of the template candidate 812 based on a tracking result of the forward object tracking and a tracking result of the backward object tracking and update the first template 811 to a second template 821 based on the confidence of the template candidate 812. For example, in response to the confidence of the template candidate 812 being greater than a threshold, the object tracking apparatus may determine that the template candidate 812 is the second template 821, and in response to the confidence of the template candidate 812 being less than the threshold, the object tracking apparatus may determine that the first template 811 is the second template 821. The object tracking apparatus may perform forward object tracking on second image frames in a second sequence group 802 using the second template 821.

In FIG. 8A, t1 represents a time at which backward object tracking starts, and t2 represents a time at which a template update is completed. Between t1 and t2, backward object tracking, confidence evaluation of the template candidate 812, and a template update may be performed. The object tracking apparatus may wait for a new template (the second template 821) without performing forward object tracking between t1 and t2 and perform forward object tracking on the second image frames after t2. For example, the object tracking apparatus may perform the forward object tracking on the second image frames in response to determining the second template 821. A time delay corresponding to a time period between t1 and t2 may occur between when the forward object tracking is performed on the first image frames and when the forward object tracking is performed on the second image frames.

Referring to FIG. 8B, the object tracking apparatus may perform forward object tracking on first image frames in a first sequence group 805 using a first template 815. The object tracking apparatus may determine a template candidate 816 based on a tracking result of the forward object tracking. The object tracking apparatus may perform backward object tracking on the first image frames in the first sequence group 805 using the template candidate 816. The object tracking apparatus may evaluate a confidence of the template candidate 816 based on a tracking result of the forward object tracking and a tracking result of the backward object tracking and update the first template 815 to a second template 825 based on the confidence of the template candidate 816.

In FIG. 8B, t1 represents a time at which backward object tracking starts, and t2 represents a time at which a template update is completed. Between t1 and t2, backward object tracking, confidence evaluation of the template candidate 812, and a template update may be performed. The object tracking apparatus may perform forward object tracking on second image frames in a second sequence group 806 using an existing template (the first template 815) instead of waiting for a new template (the second template 825). In response to completion of a template update at t2, the object tracking apparatus may perform forward object tracking on third image frames in a third sequence group 807 after t2. Continuing to perform forward object tracking temporarily using the existing template (the first template 815) while a template update is being performed may prevent a time delay corresponding to a time period between t1 and t2. A sequence group, such as the second sequence group 806, to which the existing template (the first template 815) is temporarily applied may be an intermediate sequence group, and an image frame in an intermediate sequence group may be an intermediate image frame.

Figure 9:
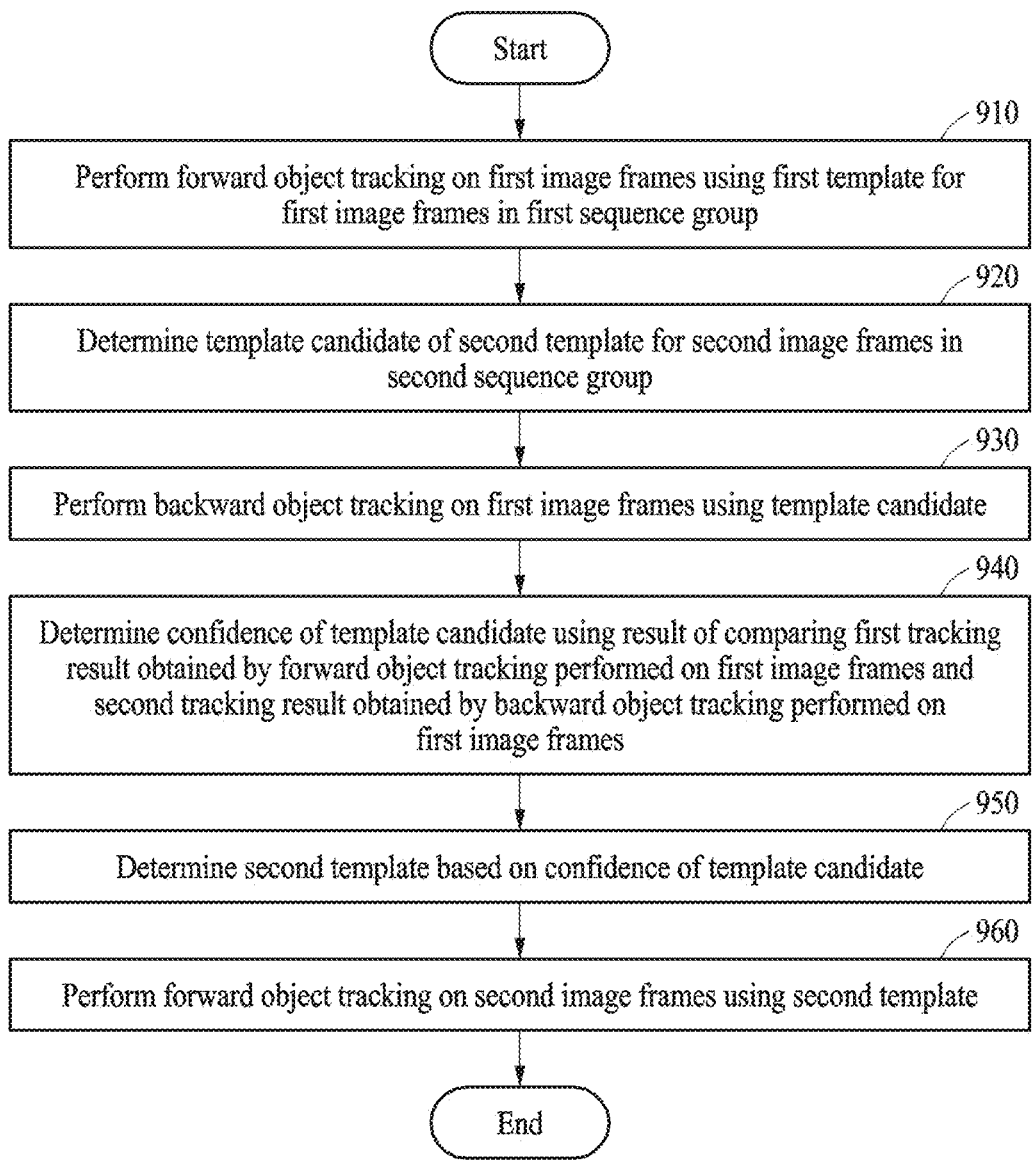
FIG. 9 illustrates an example of a method with object tracking.

FIG. 9 illustrates an example of a method with object tracking (e.g., an object tracking method). Operations 910 to 960 to be described hereinafter with reference to FIG. 9 may be performed sequentially or non-sequentially. For example, an order of operations 910 to 960 may be changed, and/or at least two operations 910 to 960 may be performed in parallel or simultaneously. Further, one or more of operations 910 to 960 may be omitted, without departing from the spirit and scope of the shown example. The operations 910 to 960 may be performed by one or more components of an object tracking apparatus (the object tracking apparatus 100 of FIG. 1, as a non-limiting example).

Referring to FIG. 9, an object tracking method 900 may include operation 910 of performing forward object tracking on first image frames using a first template for the first image frames in a first sequence group, operation 920 of determining a template candidate of a second template for second image frames in a second sequence group, operation 930 of performing backward object tracking on the first image frames using the template candidate, operation 940 of determining a confidence of the template candidate using a result of comparing a first tracking result obtained by the forward object tracking performed on the first image frames and a second tracking result obtained by the backward object tracking performed on the first image frames, operation 950 of determining the second template based on the confidence of the template candidate, and operation 960 of performing forward object tracking on second image frames using the second template.

The forward object tracking may be performed on the first image frames in order of an initial image frame of the first image frames to a last image frame of the first image frames. The backward object tracking may be performed on the first image frames in order of the last image frame of the first image frames to the initial image frame of the first image frames.

The forward object tracking and the backward object tracking may be performed on the first image frames using a same object tracking model.

The first tracking result may include first bounding boxes of the first image frames according to the forward object tracking performed on the first image frames, and the second tracking result may include second bounding boxes of the first image frames according to the backward object tracking performed on the first image frames.

The confidence of the template candidate may be determined based on any one or any combination of any two or more of a first score according to a degree of overlap between corresponding pairs of the first bounding boxes and the second bounding boxes for each corresponding image frame, a second score according to a degree of overlap between a corresponding pair of the first bounding boxes and the second bounding boxes in the initial image frame, and a third score according to a number of corresponding pairs of which a degree of overlap exceeds a preset level among the corresponding pairs of the first bounding boxes and the second bounding boxes for each image frame.

Operation 950 may include an operation of determining that the template candidate is the second template in response to the confidence of the template candidate exceeding a preset threshold and an operation of determining that the first template is the second template in response to the confidence of the template candidate being less than the preset threshold.

The object tracking method 900 may further include an operation of determining the second template candidate of the second template, an operation of performing backward object tracking on the first image frames using the second template candidate, and an operation of determining a confidence of the second template candidate using a result of comparing the first tracking result obtained by the forward object tracking performed on the first image frames and a third tracking result obtained by the backward object tracking performed on the first image frames using the second template candidate. Operation 950 may include an operation of determining the second template based on the confidence of the template candidate and the confidence of the second template candidate. The determining of the second template candidate, the backward object tracking performed on the first image frames using the second template candidate, and the determining of the confidence of the second template candidate may be performed in parallel with the determining of the template candidate, the backward object tracking performed on the first image frames using the template candidate, and the determining of the confidence of the template candidate.

The object tracking method 900 may further include an operation of performing forward object tracking on intermediate image frames in an intermediate sequence group between the first sequence group and the second sequence group for a time required to determine the second template.

The provided description referring to FIGS. 1 to 8, 10, and 11 may apply to the object tracking method of FIG. 9.

Figure 10:
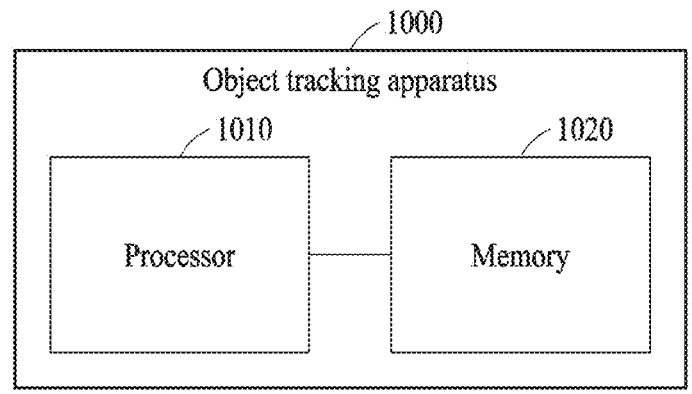
FIG. 10 illustrates an example of an apparatus with object tracking.

FIG. 10 illustrates an example of an apparatus with object tracking (e.g., an object tracking apparatus). Referring to FIG. 10, an object tracking apparatus 1000 includes a processor 1010 (e.g., one or more processors) and a memory 1020 (e.g., one or more memories). The object tracking apparatus 1000 may be or include the object tracking apparatus 100 of FIG. 1, as a non-limiting example, The memory 1020 may be connected to the processor 1010, and store instructions executable by the processor 1010, data to be calculated by the processor 1010, or data processed by the processor 1010. The memory 1020 includes a non-transitory computer readable medium, for example, a high-speed random access memory, and/or a non-volatile computer readable storage medium, for example, one or more disk storage devices, flash memory device, or other non-volatile solid state memory devices. The memory 1020 may be or include a non-transitory computer-readable storage medium storing instructions that, when executed by the processor 1010, configure the processor 1010 to perform any one, any combination, or all of the operations and methods described herein with references to FIGS. 1 to 9 and 11.

The processor 1010 may execute the instructions to perform any one, any combination, or all of the operations and methods described herein with references to FIGS. 1 to 9 and 11. For example, the processor 1010 may perform forward object tracking on first image frames using a first template for the first image frames in a first sequence group, determine a template candidate of a second template for second image frames in a second sequence group, perform backward object tracking on the first image frames using the template candidate, determine a confidence of the template candidate using a result of comparing a first tracking result obtained by the forward object tracking performed on the first image frames and a second tracking result obtained by the backward object tracking performed on the first image frames, determine the second template based on the confidence of the template candidate, and perform forward object tracking on the second image frames using the second template.

The provided description referring to FIGS. 1 to 7, 9 and 10 may apply to the object tracking apparatus 800.

Figure 11:
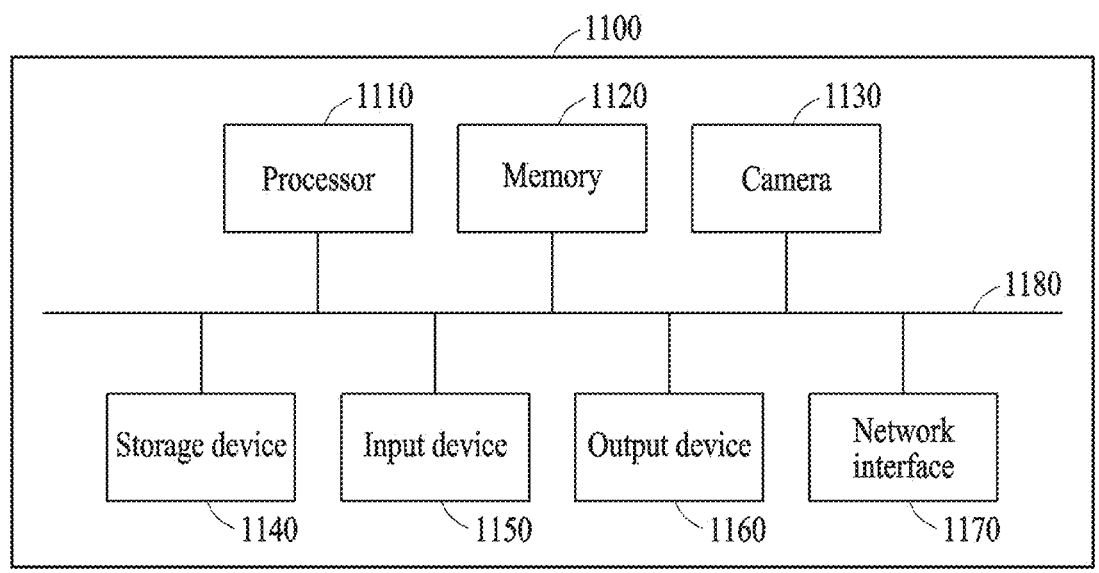
FIG. 11 illustrates an example of an electronic device.

FIG. 11 illustrates an example of an electronic device. Referring to FIG. 11, an electronic device 1100 may include a processor 1110 (e.g., one or more processor), a memory 1120 (e.g., one or more memories), a camera 1130 (e.g., one or more cameras), a storage device 1140, an input device 1150, an output device 1160, and a network interface 1170, and these components may communicate with one another through a communication bus 1180. For example, the electronic device 1100 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1100 may be or include either one or both of the object tracking apparatus 100 of FIG. 1 and the object tracking apparatus 1000 of FIG. 10.

The processor 1110 executes instructions or functions to be executed in the electronic device 1100. For example, the processor 1110 may process the instructions stored in the memory 1120 or the storage device 1140. The processor 1110 may perform any one, any combination, or all of the operations and methods described herein with references to FIGS. 1 to 10. The memory 1120 may include a computer-readable storage medium or a computer-readable storage device. The memory 1120 may store instructions to be executed by the processor 1110 and store related information while software and/or an application is executed by the electronic device 1100. The memory 1120 may be or include a non-transitory computer-readable storage medium storing instructions that, when executed by the processor 1110, configure the processor 1110 to perform any one, any combination, or all of the operations and methods described herein with references to FIGS. 1 to 10.

The camera 1130 may capture a photo and/or a video. For example, the camera 1130 may generate an input image including a plurality of image frames. The plurality of image frames may include either one or both of a template image and a search image. The storage device 1140 includes a computer-readable storage medium or computer-readable storage device. The storage device 1140 may store a larger quantity of information than the memory 1120 for a long time. For example, the storage device 1140 may include a magnetic hard disk, an optical disc, a flash memory, a floppy disk, or other non-volatile memories known in the art.

The input device 1150 may receive an input from the user in traditional ways such as through a keyboard and a mouse, and in new ways such as through touch, voice and an image. For example, the input device 1150 may include a keyboard, a mouse, a touch screen, a microphone, or any other device that detects the input from the user and transmits the detected input to the electronic device 1100. The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The provided description referring to FIGS. 1 to 10 may apply to the electronic device 1100.

The object tracking apparatuses, processors, memories, electronic devices, cameras, storage devices, input devices, output devices, network interfaces, communication buses, object tracking apparatus 100, object tracking apparatus 1000, processor 1010, memory 1020, electronic device 1100, processor 1110, memory 1120, camera 1130, storage device 1140, input device 1150, output device 1160, network interface 1170, communication bus 1180, and other apparatuses, units, modules, devices, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with object tracking, the method comprising:
    performing, using a first template image, forward object tracking on first image frames in a first sequence group;
    determining a template candidate image of a second template image for second image frames in a second sequence group;
    performing backward object tracking on the first image frames using the template candidate image;
    determining a confidence of the template candidate image using a result of comparing a first tracking result determined by the forward object tracking performed on the first image frames and a second tracking result determined by the backward object tracking performed on the first image frames;
    determining the second template image based on the confidence of the template candidate image; and
    performing forward object tracking on the second image frames using the second template image, including, in response to the confidence of the template candidate image being less than or equal to a preset threshold, discarding the second template image and continuously using the first template image in performing forward object tracking on the second image frames in the second sequence group,
    wherein the confidence of the template candidate image is determined based on a degree of overlap between at least one of corresponding pairs obtained from the first tracking result and the second tracking result.

2. The method of claim 1, wherein
    the forward object tracking is performed on the first image frames in an order of an initial image frame of the first image frames to a last image frame of the first image frames, and
    the backward object tracking is performed on the first image frames in an order of the last image frame of the first image frames to the initial image frame of the first image frames.

3. The method of claim 1, wherein the forward object tracking and the backward object tracking are performed on the first image frames using a same object tracking model.

4. The method of claim 1, wherein
    the first tracking result comprises first bounding boxes of the first image frames according to the forward object tracking performed on the first image frames, and the second tracking result comprises second bounding boxes of the first image frames according to the backward object tracking performed on the first image frames.

5. The method of claim 4, wherein the confidence of the template candidate image is determined based on any one or any combination of any two or more of
a first score according to a degree of overlap between corresponding pairs of the first bounding boxes and the second bounding boxes for each corresponding image frame,
a second score according to a degree of overlap between a corresponding pair of the first bounding boxes and the second bounding boxes for an initial image frame, and
a third score according to a number of corresponding pairs of which a degree of overlap exceeds a preset level among the corresponding pairs of the first bounding boxes and the second bounding boxes for each image frame.

6. The method of claim 1, wherein the confidence of the template candidate image is determined based on a degree of similarity between:
a portion of the first tracking result corresponding to an image frame of the first image frames; and
a portion of the second tracking result corresponding to the image frame.

7. The method of claim 1, wherein the determining of the second template image comprises:
determining that the template candidate image is the second template image in response to the confidence of the template candidate image exceeding a preset threshold; and
determining that the first template image is the second template image in response to the confidence of the template candidate image being less than or equal to the preset threshold.

8. The method of claim 1, wherein
the object tracking method further comprises:
determining a second template candidate image of the second template image;
performing backward object tracking on the first image frames using the second template candidate image; and
determining a confidence of the second template candidate image using a result of comparing the first tracking result determined by the forward object tracking performed on the first image frames and a third tracking result determined by the backward object tracking performed on the first image frames using the second template candidate image, and
the determining of the second template image comprises determining the second template image based on the confidence of the template candidate image and the confidence of the second template candidate image.

9. The method of claim 8, wherein the determining of the second template candidate image, the backward object tracking performed on the first image frames using the second template candidate image, and the determining of the confidence of the second template candidate image are performed in parallel with the determining of the template candidate image, the backward object tracking performed on the first image frames using the template candidate image, and the determining of the confidence of the template candidate image.

10. The method of claim 1, wherein the object tracking method further comprises performing forward object tracking on intermediate image frames in an intermediate sequence group between the first sequence group and the second sequence group for a time used to determine the second template image.

11. The method of claim 1, wherein the determining of the template candidate image comprises determining the template candidate image based on the first tracking result.

12. A non-transitory computer-readable storage medium storing instructions that, when executed by a processor, configure the processor to perform the method of claim 1.

13. An apparatus with object tracking, the apparatus comprising:
a processor configured to:
perform, using a first template image, forward object tracking on first image frames in a first sequence group;
determine a template candidate image of a second template image for second image frames in a second sequence group;
perform backward object tracking on the first image frames using the template candidate image;
determine a confidence of the template candidate image using a result of comparing a first tracking result determined by the forward object tracking performed on the first image frames and a second tracking result determined by the backward object tracking performed on the first image frames;
determine the second template image based on the confidence of the template candidate image; and
perform forward object tracking on the second image frames using the second template image, including, in response to the confidence of the template candidate image being less than or equal to a preset threshold, discarding the second template image and continuously using the first template image in performing forward object tracking on the second image frames in the second sequence group,
wherein the confidence of the template candidate image is determined based on a degree of overlap between at least one of corresponding pairs obtained from the first tracking result and the second tracking result.

14. The apparatus of claim 13, wherein
the forward object tracking is performed on the first image frames in an order of an initial image frame of the first image frames to a last image frame of the first image frames, and
the backward object tracking is performed on the first image frames in an order of the last image frame of the first image frames to the initial image frame of the first image frames.

15. The apparatus of claim 13, wherein
the first tracking result comprises first bounding boxes of the first image frames according to the forward object tracking performed on the first image frames, and
the second tracking result comprises second bounding boxes of the first image frames according to the backward object tracking performed on the first image frames.

16. The apparatus of claim 15, wherein the confidence of the template candidate image is determined based on any one or any combination of any two or more of
a first score according to a degree of overlap between corresponding pairs of the first bounding boxes and the second bounding boxes for each corresponding image frame,
a second score according to a degree of overlap between a corresponding pair of the first bounding boxes and the second bounding boxes for an initial image frame, and a third score according to a number of corresponding pairs of which a degree of overlap exceeds a preset level among the corresponding pairs of the first bounding boxes and the second bounding boxes for each image frame.

17. The apparatus of claim 13, wherein the processor is configured to:
    determine a second template candidate image of the second template image;
    perform backward object tracking on the first image frames using the second template candidate image;
    determine a confidence of the second template candidate image using a result of comparing the first tracking result determined by the forward object tracking performed on the first image frames and a third tracking result determined by the backward object tracking performed on the first image frames using the second template candidate image; and
    for the determining of the second template image, determine the second template image based on the confidence of the template candidate image and the confidence of the second template candidate image.

18. The apparatus of claim 17, wherein the determining of the second template candidate image, the backward object tracking performed on the first image frames using the second template candidate image, and the determining of the confidence of the second template candidate image are performed in parallel with the determining of the template candidate image, the backward object tracking performed on the first image frames using the template candidate image, and the determining of the confidence of the template candidate image.

19. The apparatus of claim 13, wherein the processor is configured to perform forward object tracking on intermediate image frames in an intermediate sequence group between the first sequence group and the second sequence group for a time used to determine the second template image.

20. An electronic device, comprising:
    a camera configured to generate an input image comprising a plurality of image frames; and
    a processor configured to:
        perform, using a first template image, forward object tracking on first image frames in a first sequence group of the input image;
        determine a template candidate image of a second template image for second image frames in a second sequence group of the input image;
        perform backward object tracking on the first image frames using the template candidate image;
        determine a confidence of the template candidate image using a result of comparing a first tracking result determined by the forward object tracking performed on the first image frames and a second tracking result determined by the backward object tracking performed on the first image frames;
        determine the second template image based on the confidence of the template candidate image; and
        perform forward object tracking on the second image frames using the second template image, including, in response to the confidence of the template candidate image being less than or equal to a preset threshold, discarding the second template image and continuously using the first template image in performing forward object tracking on the second image frames in the second sequence group,
    wherein the confidence of the template candidate image is determined based on a degree of overlap between at least one of corresponding pairs obtained from the first tracking result and the second tracking result.

\* \* \* \* \*